US012663296B2

(12) United States Patent
Shirakawa et al.

(10) Patent No.: US 12,663,296 B2
(45) Date of Patent: Jun. 23, 2026

(54) POSITION DETECTION DEVICE

(71) Applicant: Proterial, Ltd., Tokyo (JP)

(72) Inventors: Yohei Shirakawa, Tokyo (JP); Yuta Sugiyama, Tokyo (JP)

(73) Assignee: Proterial, Ltd., Tokyo (JP)

( * ) Notice: Subject to any disclaimer, the term of this patent is extended or adjusted under 35 U.S.C. 154(b) by 133 days.

(21) Appl. No.: 18/625,343

(22) Filed: Apr. 3, 2024

(65) Prior Publication Data

US 2024/0337513 A1     Oct. 10, 2024

(30) Foreign Application Priority Data

Apr. 6, 2023     (JP) ................................. 2023-062206

(51) Int. Cl.
*G01D 5/245* (2006.01)
*B62D 5/04* (2006.01)
*B62D 15/02* (2006.01)

(52) U.S. Cl.
CPC ......... *G01D 5/2451* (2013.01); *B62D 5/0421* (2013.01); *B62D 5/0442* (2013.01); *B62D 15/0225* (2013.01); *G01D 2205/10* (2021.05)

(58) Field of Classification Search
CPC .. G01D 5/245; G01D 2205/10; G01D 5/2415; B62D 5/0421; B62D 5/0442; B62D 15/0225; B62D 15/0235; G01B 7/003
See application file for complete search history.

(56) References Cited

U.S. PATENT DOCUMENTS

| | | | | | |
|---|---|---|---|---|---|
| 2,692,534 | A | * | 10/1954 | Pluess | ..................... F41A 17/08 |
| | | | | | 89/134 |
| 4,619,155 | A | * | 10/1986 | Futaba | ................... B62D 3/123 |
| | | | | | 180/428 |
| 6,629,578 | B2 | * | 10/2003 | Saruwatari | .............. F16H 55/20 |
| | | | | | 180/444 |

FOREIGN PATENT DOCUMENTS

| | | | | | |
|---|---|---|---|---|---|
| CN | 106500682 | B | * | 10/2019 | ......... G01C 19/5663 |
| JP | 2012220214 | A | * | 11/2012 | |
| WO | 2021/210125 | A1 | | 10/2021 | |

* cited by examiner

*Primary Examiner* — Lee E Rodak
*Assistant Examiner* — Zannatul Ferdous
(74) *Attorney, Agent, or Firm* — Studebaker Brackett PLLC

(57) ABSTRACT

A position detection device for detecting a position of a rack shaft having a rack teeth portion that meshes with a pinion gear in a part in an axial direction, is provided with a capacitance member that is arranged around a periphery of the rack shaft and forms a capacitive load together with the rack shaft, and a calculation unit that calculates the position of the rack shaft based on a capacitance between the rack shaft and the capacitance member. The capacitance member is arranged to face at least a part of the rack teeth portion. The capacitance changes in accordance with the position of the rack shaft.

4 Claims, 8 Drawing Sheets

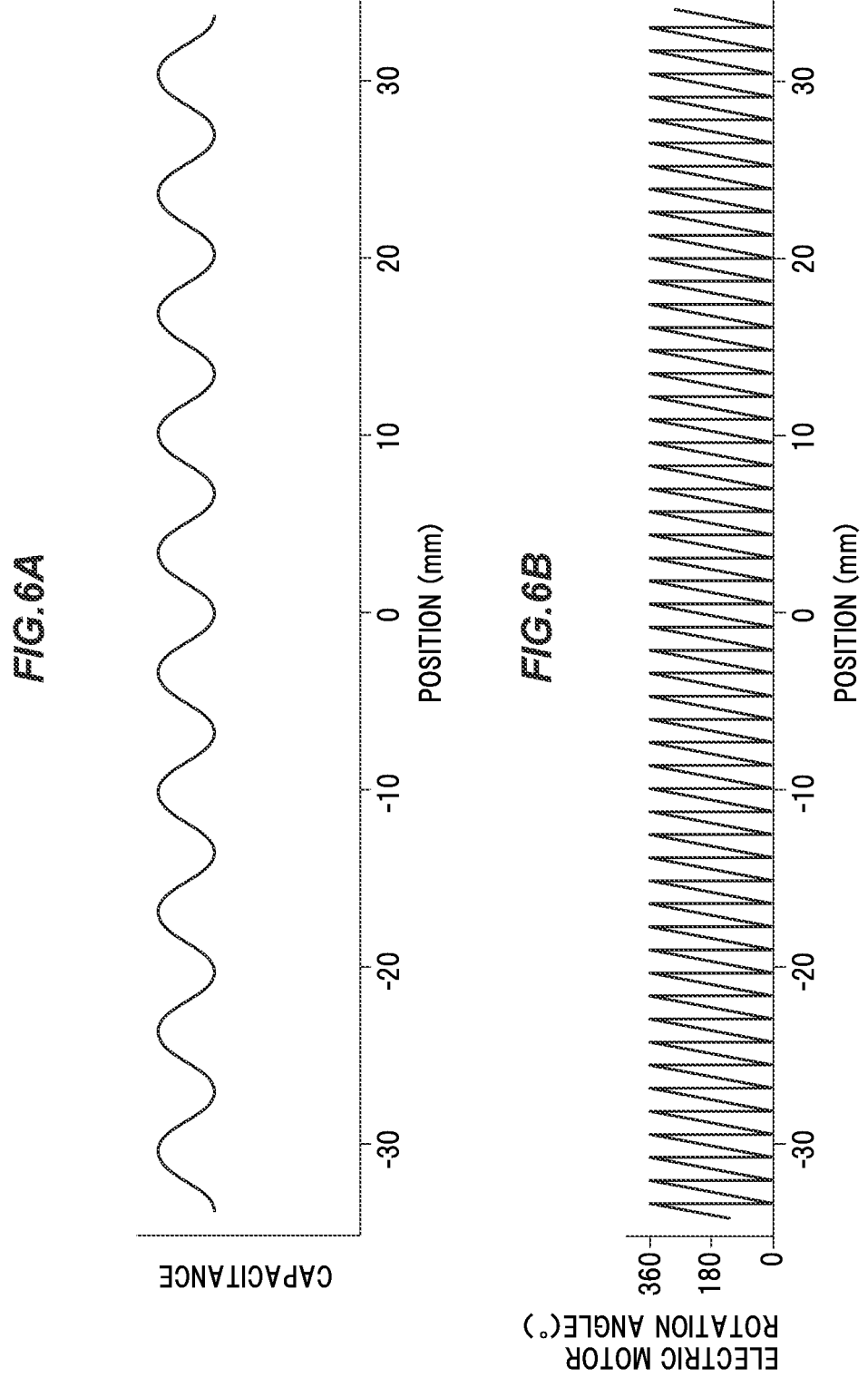

POSITION DETECTION DEVICE

CROSS-REFERENCE TO RELATED APPLICATIONS

The present application is based on Japanese patent application No. 2023-062206 filed on Apr. 6, 2023, the entire contents of which are incorporated herein by reference.

TECHNICAL FIELD

The present invention relates to a position detection device for detecting a position of a rack shaft.

BACKGROUND OF THE INVENTION

Conventionally, a device for detecting a position of a rack shaft in a vehicle steering device has been proposed.

A detection unit described in Patent Literature 1 detects an axial position of a rack shaft of an electric power steering device and includes a DC power supply, a permanent magnet, a group of elements composed of first to fourth magnetoresistive elements disposed between the permanent magnet and the rack shaft, and a calculation unit for calculating the position of the rack shaft. In the element group, a series circuit including the first and second magnetoresistive elements being connected in series, and a series circuit including the third and fourth magnetoresistive elements being connected in series are connected in parallel to form a bridge circuit. To the calculation unit, a potential of a first terminal connected between the first magnetoresistive element and the second magnetoresistive element and a potential of a second terminal connected between the third magnetoresistive element and the fourth magnetoresistive element are input. Plural grooves extending in a direction inclined with respect to the axial direction of the rack shaft are formed on the surface of the rack shaft facing the element group.

In the detection unit configured as described above, when the rack shaft moves in the axial direction due to the rotation of a pinion gear shaft meshing with the rack shaft and the relative positions of the first to fourth magnetoresistive elements with respect to the grooves change, the electric resistance balance of the first to fourth magnetoresistive elements changes, so that the potentials of the first terminal and the second terminal change. The calculation unit calculates the position of the rack shaft based on changes in these potentials.

CITATION LIST

Patent Literature 1: WO2021/210125

SUMMARY OF THE INVENTION

In the detection unit disclosed in Patent Literature 1, e.g., when a vibration caused by vehicle running or the like moves the rack shaft in the forward and backward directions of the vehicle or rotates the rack shaft around the central axis line, the positions of the first to fourth magnetoresistive elements and relative to the plural grooves change, and an error will occur in the detected positions of the rack shaft. Accordingly, it is an object of the present invention to provide a position detection device capable of increasing the detection accuracy of the position of the rack shaft.

In order to solve the problems mentioned above, the present invention provides a position detection device configured to detect a position of a rack shaft having a rack teeth portion that meshes with a pinion gear in a part in an axial direction, comprising:

a capacitance member that is arranged around a periphery of the rack shaft and forms a capacitive load together with the rack shaft; and a calculation unit that calculates the position of the rack shaft based on a capacitance between the rack shaft and the capacitance member, wherein the capacitance member is arranged to face at least a part of the rack teeth portion, and wherein the capacitance changes in accordance with the position of the rack shaft.

Advantageous Effects of the Invention

According to the position detection device of the present invention, it is possible to increase the detection accuracy of the position of the rack shaft.

BRIEF DESCRIPTION OF DRAWINGS

FIG. 2 is a perspective view showing a portion of a rack shaft and a capacitance member.

FIG. 3 is a configuration diagram showing the rack shaft and the capacitance member viewed from a direction perpendicular to the tooth traces of a plurality of rack teeth and the axial direction of the rack shaft.

FIG. 5A and FIG. 5B are illustrations showing the rack teeth portion of a plurality of rack teeth viewed from the tooth trace direction, together with the capacitance member in a cross-section along the central axis line.

FIG. 6A is a graph showing an example of the relationship between the rack shaft position and the capacitance.

FIG. 6B is a graph showing an example of the relationship between the rack shaft position and the rotation angle of an electric motor.

FIG. 7 is a perspective view showing a portion of a capacitance member and a rack shaft in the second embodiment.

FIG. 8 is a configuration diagram showing the rack shaft and the capacitance member viewed from the direction perpendicular to the tooth traces of the plurality of rack teeth and the axial direction of the rack shaft.

DETAILED DESCRIPTION OF THE INVENTION

First Embodiment

Figure 1:
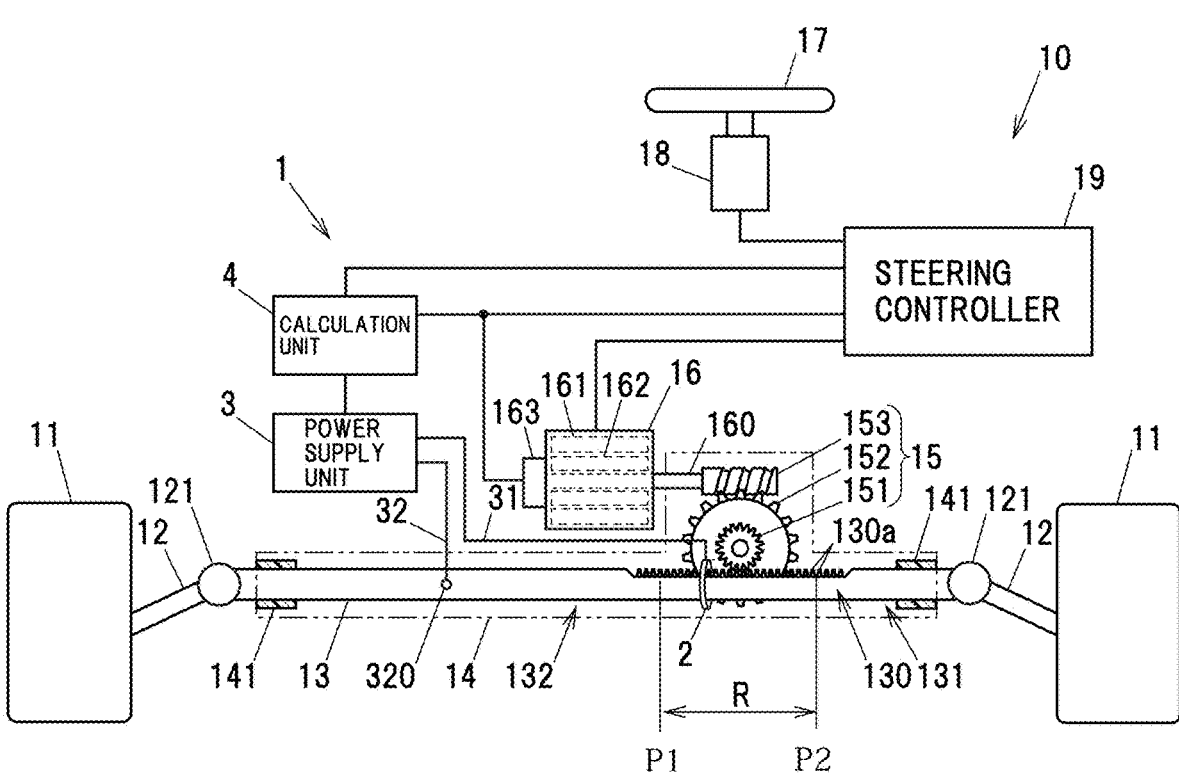
FIG. 1 is a schematic diagram of a vehicle equipped with a steer-by-wire steering device with a stroke sensor as a position detection device according to the first embodiment of the present invention.

FIG. 1 is a schematic diagram of a vehicle equipped with a steer-by-wire steering device 10 having a stroke sensor 1 as a position detection device according to a first embodiment of the present invention. In FIG. 1, the steering device 10 is viewed from the rear side in the vehicle front-rear direction, with the right side of the drawing corresponding to the right side in the vehicle width direction and the left side of the drawing corresponding to the left side in the vehicle width direction.

As shown in FIG. 1, the steering device 10 comprises a stroke sensor 1, left and right tie rods 12 respectively connected to steerable wheels 11 (left and right front wheels), a rack shaft 13 having a rack teeth portion 130 in an axial direction, a cylindrical housing 14 accommodating the rack shaft 13, a worm reduction mechanism 15 having a pinion gear 151 meshed with the rack teeth portion 130 of the rack shaft 13, an electric motor 16 that applies a moving force in the vehicle width direction to the rack shaft 13 via the worm reduction mechanism 15, a steering wheel 17 operated by the driver, a steering angle sensor 18 that detects the steering angle of the steering wheel 17, and a steering controller 19 that controls the electric motor 16 based on the steering angle detected by the steering angle sensor 18.

In FIG. 1, the housing 14 is shown as a virtual line. The rack shaft 13 is supported by a pair of rack bushings 141 attached to both ends of the housing 14 and is axially movable with respect to the housing 14. The rack shaft 13 is made of steel, e.g., carbon steel or the like, but any conductive metal may be used as a suitable material for the rack shaft 13. The housing 14 is made of, e.g., an aluminum alloy which is die-cast molded in a tubular shape. Ball joint sockets 121 are attached to both ends of the rack shaft 13, and the left and right tie rods 12 are pivotably connected to the rack shaft 13 via the ball joint sockets 121. When the rack shaft 13 moves in the axial direction, the left and right steerable wheels 11 are steered.

The stroke sensor 1 detects the axial position of the rack shaft 13 and outputs the detected position data to the steering controller 19. The steering controller 19 controls the electric motor 16 so that the position of the rack shaft 13 detected by the stroke sensor 1 is in accordance with the steering angle of the steering wheel 17 detected by the steering angle sensor 18.

The worm reduction mechanism 15 has a worm wheel 152 and a worm gear 153, and the pinion gear 151 is fixed to the worm wheel 152. The worm gear 153 is fixed to the motor shaft 160 of the electric motor 16. The electric motor 16 generates torque by a motor current supplied from the steering controller 19, and rotates and drives the worm wheel 152 and the pinion gear 151 via the worm gear 153. When the electric motor 16 rotates, the pinion gear 151 rotates at a slower speed than the motor shaft 160, causing the rack shaft 13 to move in the axial direction.

The electric motor 16 has a stator 161 and a rotor 162, and the rotor 162 rotates in unison with the motor shaft 160 with respect to the stator 161. The rotation angle of the rotor 162 relative to the stator 161 is detected by the rotation angle sensor 163. The rotation angle sensor 163 is a resolver capable of detecting the rotation angle of the rotor 162 in the range of one rotation (0° or more and less than 360°). A signal indicating the detection result of the rotation angle sensor 163 is output to the steering controller 19.

The rack shaft 13 can move to the right and left in the vehicle width direction within a predetermined range from a neutral position when the steering angle of the steerable wheel 11 is zero. In FIG. 1, a stroke range R, which corresponds to the maximum travel distance of the rack shaft 13 when the steering wheel 17 is steered from the maximum steering angle of one side to the maximum steering angle of the other, is indicated by a double arrow. The stroke sensor 1 can detect an absolute position of the rack shaft 13 relative to the housing 14 over the entire stroke range R. The rack teeth portion 130 are formed with a length slightly longer than the stroke range R in the axial direction of the rack shaft 13.

The stroke sensor 1 has a capacitance member (electrostatic capacitive member) 2 arranged around at least a part of the rack teeth portion 130 and around the periphery of the rack shaft 13, a power supply unit 3 that applies an AC voltage between the capacitance member 2 and the rack shaft 13, and a calculation unit 4 that calculates the position of the rack shaft 13 based on the capacitance between the capacitance member 2 and the rack shaft 13. The capacitance member 2 forms a capacitive load together with the rack shaft 13.

The power supply unit 3 is connected to the capacitance member 2 and the rack shaft 13 by first and second conductor wires 31, 32. The first conductor wire 31 electrically connects the power supply unit 3 to the capacitance member 2, and the second conductor wire 32 electrically connects the power supply unit 3 to the rack shaft 13. One end of the second conductor wire 32 is connected to the rack shaft 13 by, e.g., by using a connecting terminal and a bolt, but not limited to this, one end of the second conductor wire 32 may be electrically connected to the rack shaft 13 by using a conductive brush or welding. In FIG. 1, a connection point 320 between the second conductor wire 32 and the rack shaft 13 is schematically shown.

The power supply unit 3 applies, e.g., an AC voltage of 1 MHz to 10 MHz between the capacitance member 2 and the rack shaft 13. The calculation unit 4 obtains from the power supply unit 3, e.g., data on the current flowing from the power supply unit 3 to the capacitance member 2 and data on the voltage applied between the capacitance member 2 and the rack shaft 13, and calculates the capacitance between the capacitance member 2 and the rack shaft 13 based on the relationship between the current and the voltage. Hereinafter, the capacitance between the capacitance member 2 and the rack shaft 13 is simply referred to as the capacitance.

Figure 2:
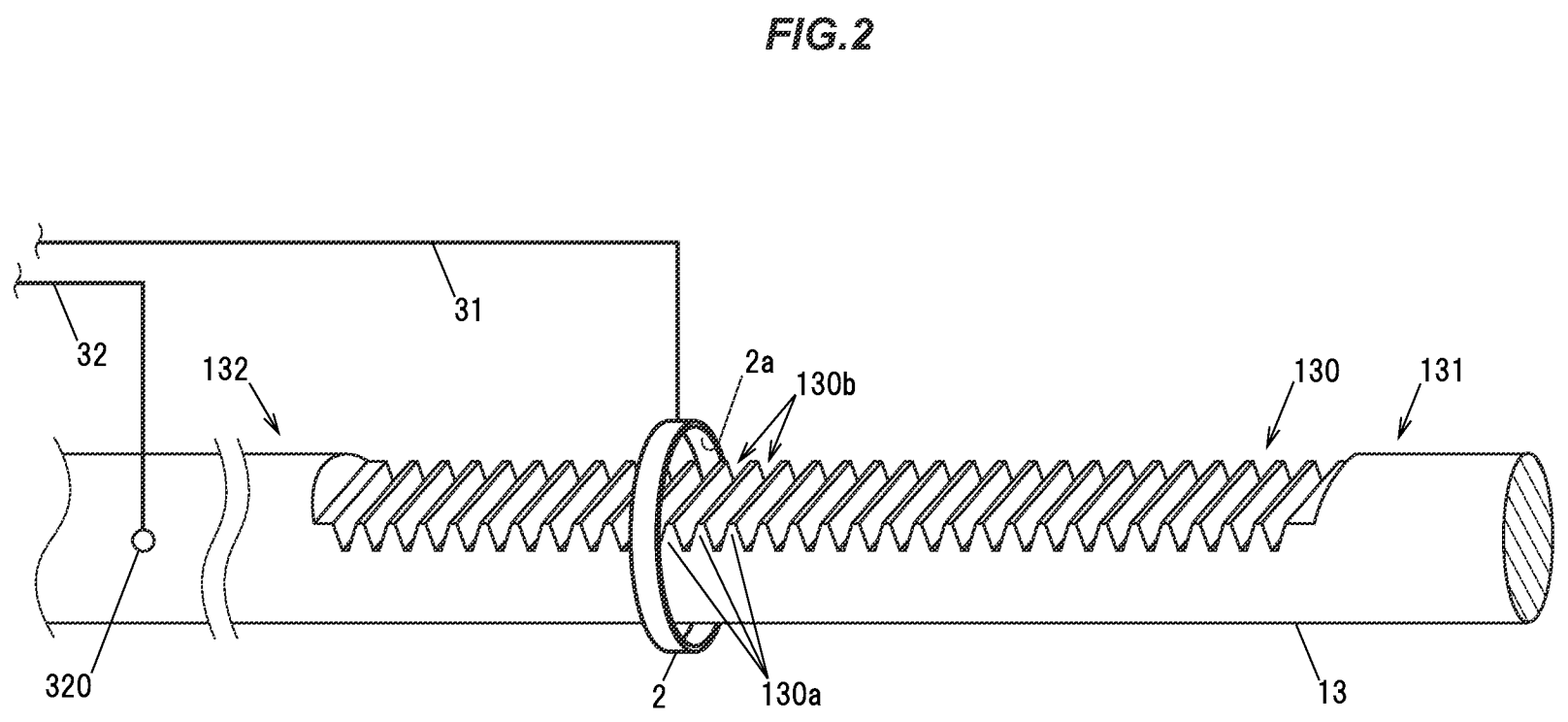

FIG. 2 is a perspective view showing a portion of the rack shaft 13 and the capacitance member 2. The rack shaft 13 has the rack teeth portion 130 and cylindrical portions 131, 132 with a circular cross section, disposed on one side and the other side of the rack teeth portion 130 in the axial direction. The rack teeth portion 130 is formed by cutting down a portion of a rod-shaped material of circular cross-section formed to have the same diameter as the cylindrical portions 131, 132. The cross-sectional area of the rack teeth portion 130 in the cross-section perpendicular to the axial direction of the rack shaft 13 is smaller than that of the cylindrical portions 131, 132.

The capacitance member 2 is made of a good conductive metal such as aluminum or copper, and is arranged to face at least a part of the rack teeth portion 130. In the present embodiment, the capacitance member 2 is formed in an annular shape and the rack teeth portion 130 are inserted inside the capacitance member 2. The inner surface 2a of the capacitance member 2 facing the rack teeth portion 130 is parallel to the axial direction of the rack shaft 13.

The rack teeth portion 130 have a plurality of rack teeth 130a at predetermined intervals along the axial direction of the rack shaft 13. Each of the rack teeth 130a has a tooth trace inclined with respect to the axial direction of the rack shaft 13. Tooth grooves 130b are formed between the plurality of rack teeth 130a. In the example shown in FIG. 2, the number of rack teeth 130a in the rack teeth portion 130 is 30.

Figure 3:
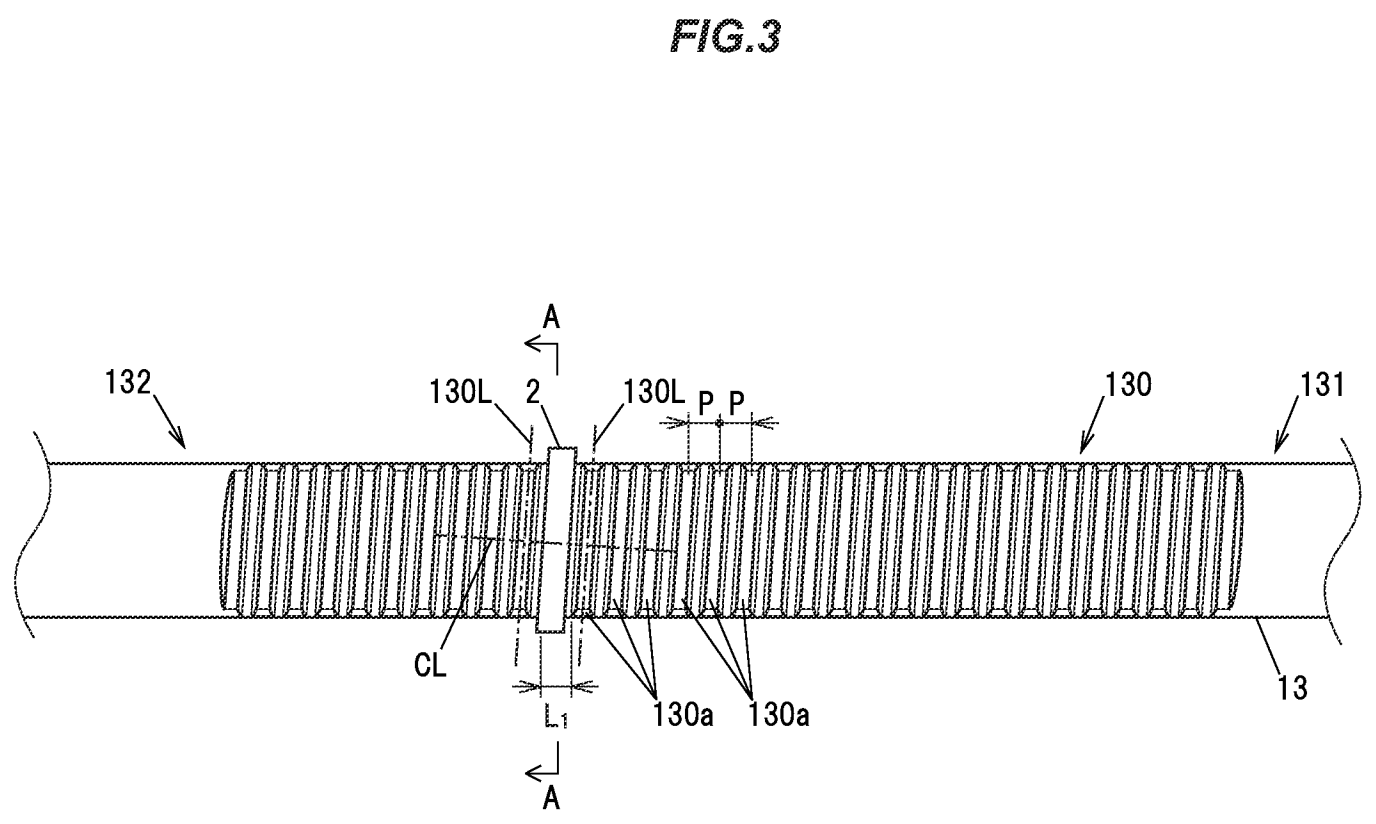

FIG. 3 is a configuration diagram showing the rack shaft 13 and the capacitance member 2 viewed from a direction perpendicular to the tooth trace direction of the plurality of rack teeth 130a and the axial direction of the rack shaft 13. In FIG. 3, the tooth trace lines 130L of the two rack teeth 130a in the vicinity of the capacitance member 2 are shown as single-dotted lines, and the central axis line CL of the capacitance member 2 is shown as a double-dotted line. The capacitance member 2 is arranged so that the central axis line CL is perpendicular to the tooth trace direction of the rack teeth 130a in the rack teeth portion 130. The capacitance member 2 has a length $L_1$ in the axial direction of the rack shaft 13 that is less than or equal to a pitch of the plurality of rack teeth 130a in the axial direction of the rack shaft 13. In FIG. 3, the pitch of the plurality of rack teeth 130a is indicated by P.

Figure 4:
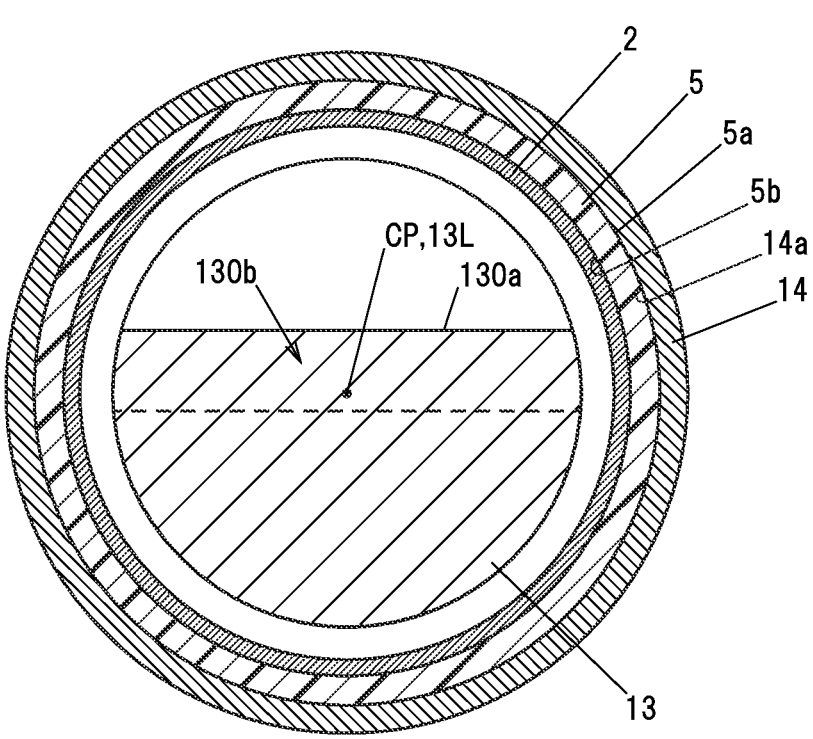
FIG. 4 is a cross-sectional view of the rack shaft taken along a line A-A of FIG. 3, showing the capacitance member, a housing, and a holding member together.

FIG. 4 is a cross-sectional view of the rack shaft 13 taken along a line A-A in FIG. 3 perpendicular to the axial direction of the rack shaft 13, showing the capacitance member 2, the housing 14, and the holding member 5 that holds the capacitance member 2 against the housing 14 together. The holding member 5 made of an insulating material such as resin is formed in a cylindrical shape, and its outer surface 5a is fixed to an inner surface 14a of the housing 14, e.g., by adhesion. The capacitance member 2 is fixed to the inner surface 5b of the holding member 5, e.g., by adhesion. The position of the center point CP of the capacitance member 2 in this cross-sectional view coincides with the position of the center line 13L of the cylindrical portions 131, 132 in the rack shaft 13.

FIGS. 5A and 5B illustrate the rack teeth portion 130 viewed from the tooth trace direction of the plurality of rack teeth 130a, together with the capacitance member 2 in a cross-section taken along the central axis line CL. FIG. 5A shows the rack tooth 130a inside the capacitance member 2 and FIG. 5B shows the tooth groove portion 130b inside the capacitance member 2. The volume of the rack shaft 13 in the area inside the capacitance member 2 is larger when the rack tooth 130a is located inside the capacitance member 2 and smaller when the tooth groove 130b is located inside the capacitance member 2. As a result, the capacitance is larger when the rack tooth 130a is located inside the capacitance member 2 and smaller when the tooth groove portion 130b is located inside the capacitance member 2.

In other words, the capacitance changes in accordance with the position of the rack shaft 13. The length $L_1$ of the capacitance member 2 in the axial direction of the rack shaft 13 is determined so that the capacitance changes with a period corresponding to the pitch P of the plurality of rack teeth 130a in the axial direction of the rack shaft 13 while the rack shaft 13 is moving, and the capacitance member 2 is arranged to face the rack teeth portion 130.

FIG. 6A is a graph showing an example of the relationship between the position of rack shaft 13 and the capacitance. FIG. 6B is a graph showing an example of the relationship between the position of rack shaft 13 and the rotation angle of electric motor 16. The horizontal axis of the graphs in FIGS. 6A and 6B shows the rack shaft 13 positions back and forth from the neutral position 0 (mm) of the rack shaft 13 when the turning angle is zero. In this horizontal axis, the position of the rack shaft 13 when the rack shaft 13 moves from the neutral position to one side in the axial direction (for example, to the right of the vehicle) is positive, and the position of the rack shaft 13 when the rack shaft 13 moves from the neutral position to the other side in the axial direction (for example, to the left of the vehicle) is negative.

The electric motor 16 rotates more than one revolution (360°) while the rack shaft 13 moves for one pitch of the plurality of rack teeth 130a. When the rotation angle of the electric motor 16 during the movement of the rack shaft 13 for one pitch of the plurality of rack teeth 130a is represented by X and X is expressed as 360×n+α (°) (n is an integer, 0<α<360), the reduction ratio of the worm reduction mechanism 15 is set in such a manner that none of α×1, α×2, α×3, . . . α×m (m is the number of rack teeth 130a located inside the capacitance member 2 during their movement from one moving end to the other end of the stroke range R) is a multiple of 360.

The calculation unit 4 calculates the position of the rack shaft 13 based on the rotation angle and capacitance of the electric motor 16 detected by the rotation angle sensor 163. With the reduction ratio of the worm reduction mechanism 15 set as described above, the calculation unit 4 can detect the absolute position of the rack shaft 13 over the entire stroke range R. In other words, although the position of the rack shaft 13 can be detected within the range of one pitch of the rack teeth 130a by the capacitance alone, it is not possible to determine which of the plurality of rack teeth 130a or of the plurality of tooth grooves 130b is located inside the capacitance member 2. However, this can be determined by referring to the rotation angle of the electric motor 16 in combination with the capacitance. The rotation angle of the electric motor 16 corresponding to the capacitance at each position within one pitch of the rack teeth 130a is different for each pitch within the stroke range R.

After the steering device 10 is assembled in vehicle manufacturing, a calibration is performed, e.g., to save the rotation angle of the electric motor 16 in the steering controller 19, with the steerable wheel 11 at a zero steering angle. With the saved data of the rotation angle, the steering controller 19 calculates the position of the rack shaft 13 based on the rotation angle of the electric motor 16 and the capacitance. Alternatively, at the time of assembly of the steering device 10, the electric motor 16 may be installed in the condition where the steering angle of the steerable wheel 11 and the rotation angle of the electric motor 16 are set to predetermined values.

Advantageous Effect of the First Embodiment

According to the first embodiment described above, the position of the rack shaft 13 can be detected with increased accuracy due to its less susceptibility to vibrations caused by vehicle running. More specifically, the position of the rack shaft 13 can be uniquely detected over the entire stroke range R with a resolution corresponding to a product of the resolution of the rotation angle sensor 163 multiplied by the reduction ratio of the worm reduction mechanism 15.

Second Embodiment

Next, the second embodiment of the present invention will be explained. The stroke sensor, as a position detection device, can detect the position of the rack shaft 13 as in the first embodiment, but the length and position of the capacitance member in the axial direction of the rack shaft 13 and the calculation method in the calculation unit 4 differ from those in the first embodiment.

Figure 7:
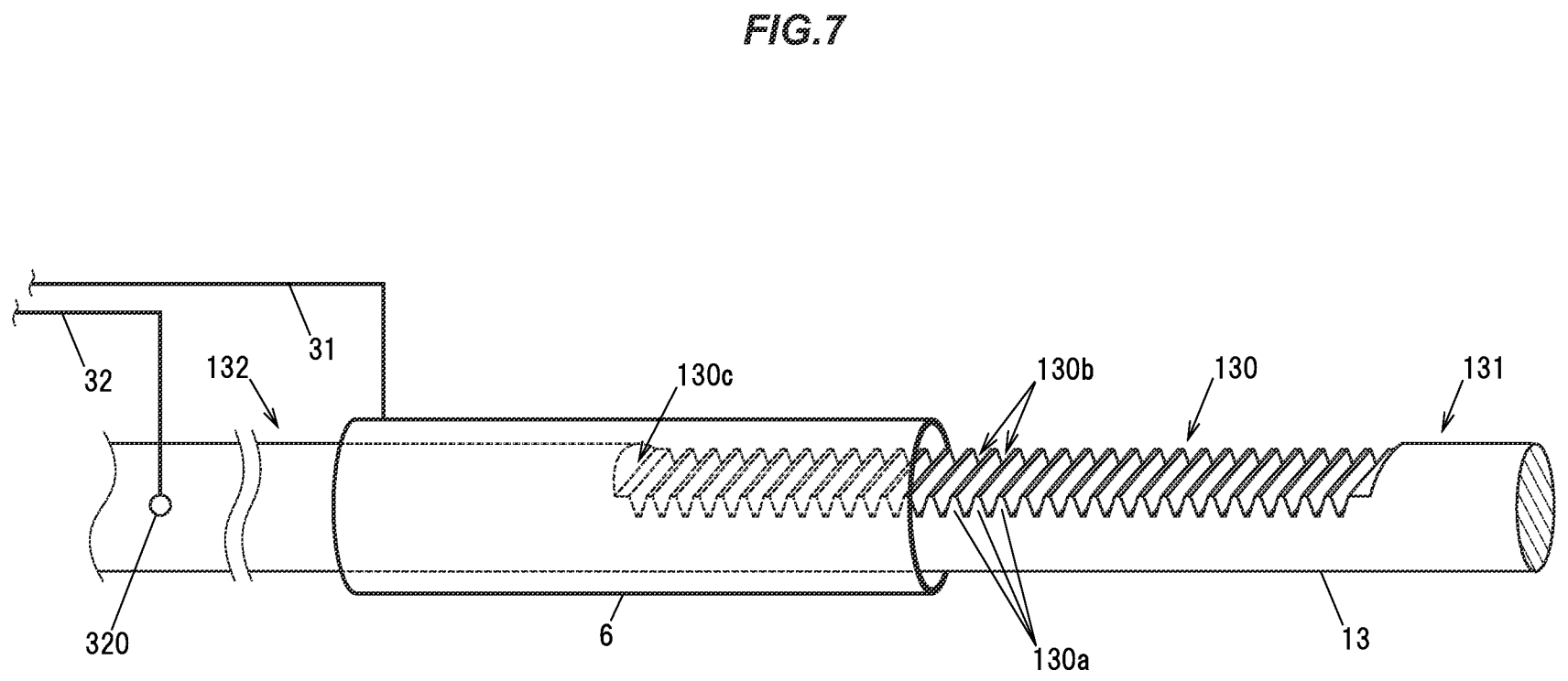
Figure 8:
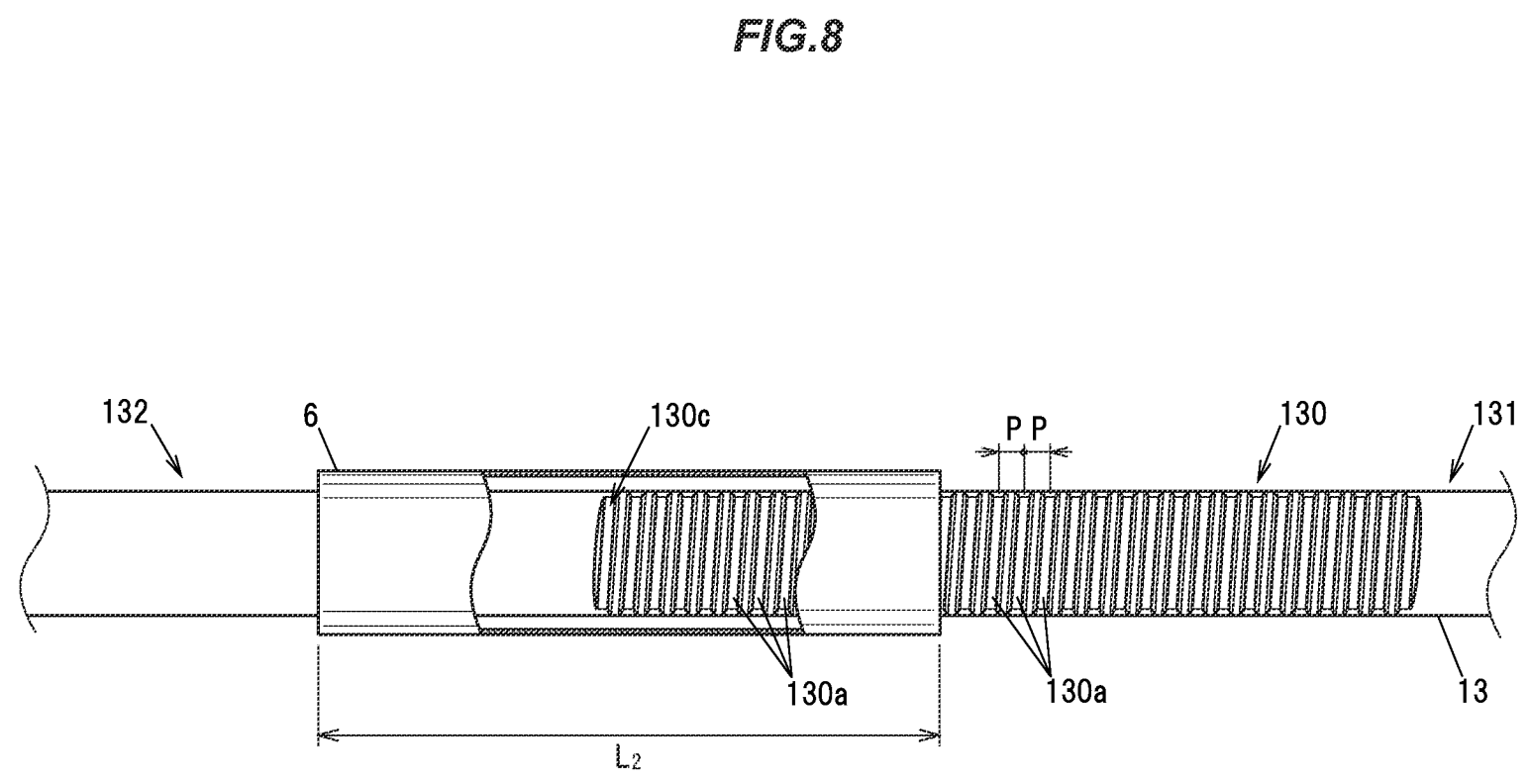

FIG. 7 is a perspective view showing a portion of the rack shaft 13 and the capacitance member 6 according to the present embodiment. FIG. 8 is a configuration diagram showing the rack shaft 13 and the capacitance member 6 viewed from the direction perpendicular to the tooth trace of the plurality of rack teeth 130a and the axial direction of the rack shaft 13. The capacitance member 6 is held in the housing 14 by the holding member 5, as the capacitance member 2 according to the first embodiment. In FIG. 7, the rack shaft 13 inside the capacitance member 6 is shown in light color.

The capacitance member 6 is cylindrical, arranged to surround the periphery of one axial end 130c of the rack teeth portion 130. In the present embodiment, the capacitance member 6 is arranged to surround the periphery of the one axial end 130c on the left side of the vehicle in the rack teeth portion 130, but the capacitance member 6 may be arranged to surround the periphery of the axial end on the right side of the vehicle in the rack teeth portion 130. A length $L_2$ of the capacitance member 6 in the axial direction of the rack shaft 13 is more than or equal to the length of the stroke range R in the axial direction of the rack shaft 13, and when the rack shaft 13 is in the neutral position, the capacitance member 6 is arranged so that the axial end 130c of the rack teeth portion 130 is positioned at the center of the length direction of the capacitance member 6.

An AC voltage is applied between the capacitance member 6 and the rack shaft 13 by the power supply unit 3 as in the first embodiment. The capacitance between the capacitance member 6 and the rack shaft 13 changes according to the change in the volume of the rack shaft 13 inside the capacitance member 6. The volume of the rack shaft 13 inside the capacitance member 6 increases as the ratio of the length of the rack teeth portion 130 inside the capacitance member 6 decreases, and the ratio of the length of the cylindrical portion 132 increases. The calculation unit 4 calculates the position of the rack shaft 13 based on the capacitance between the capacitance member 6 and the rack shaft 13. Hereinafter, the capacitance between the capacitance member 6 and the rack shaft 13 is simply referred to as the capacitance.

Figure 9:
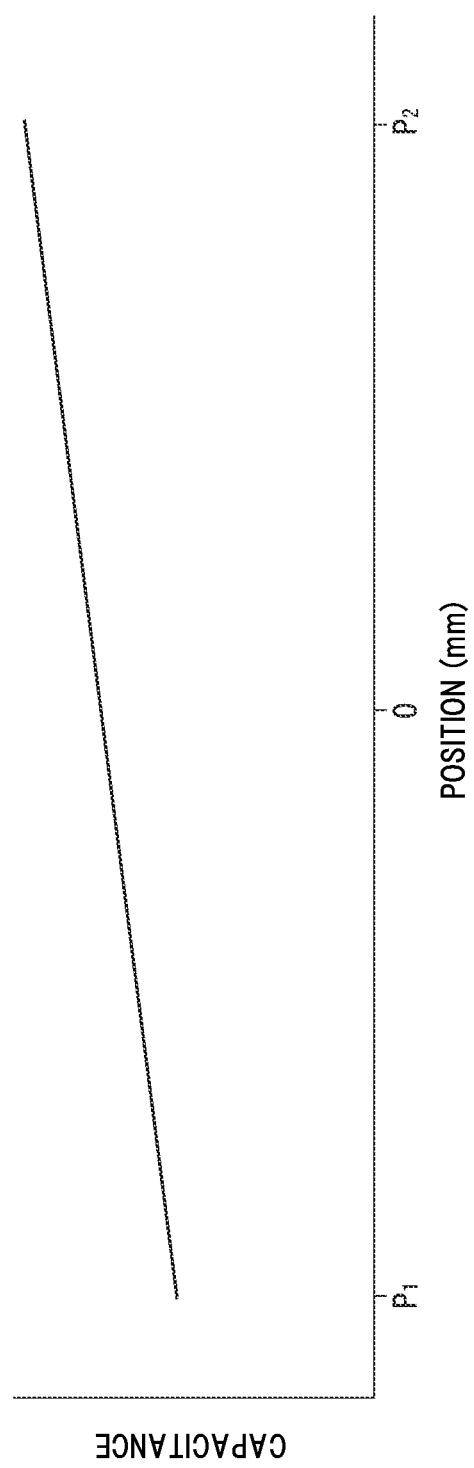
FIG. 9 is a graph showing an example of the relationship between the rack shaft position and the capacitance.

FIG. 9 shows an example of the relationship between the position of the rack shaft 13 and the capacitance, with the position of the rack shaft 13 in the axial direction as the horizontal axis. In the present embodiment, the capacitance increases monotonically while the rack shaft 13 moves from one moving end $P_1$ of the stroke range R (e.g., the left moving end of the vehicle) to the other moving end $P_2$ (e.g., the right moving end of the vehicle). This allows the calculation unit 4 to calculate the position of the rack shaft 13 based on the capacitance.

The calculation unit 4 may also calculate the position of the rack shaft 13 based on the rotation angle of the electric motor 16 detected by the rotation angle sensor 163 and the capacitance. In this case, the electric motor 16 rotates multiple times while the rack shaft 13 moves from one end to the other end of the stroke range R. Because a rotation zone where the electric motor 16 is among the multiple rotations can be determined by the capacitance, the absolute position of the rack shaft 13 can be calculated based on this determination result and the rotation angle of the electric motor 16.

The second embodiment also allows for high-accuracy detection of the position of rack shaft 13, as in the first embodiment.

Summary of Embodiments

Next, technical ideas understood from the embodiments described above will be described with reference to the reference numerals and the like in the first and second embodiments. However, each reference numeral in the following description does not limit the constituent elements in the claims to the members and the like specifically shown in the first and second embodiments.

According to the first feature, a position detection device (stroke sensor) 1 configured to detect a position of a rack shaft 13 having a rack teeth portion 130 that meshes with a pinion gear 151 in a part in an axial direction includes a capacitance member 2, 6 that is arranged around a periphery of the rack shaft 13 and forms a capacitive load together with the rack shaft 13; and a calculation unit 4 that calculates the position of the rack shaft 13 based on a capacitance between the rack shaft 13 and the capacitance member 2, 6, wherein the capacitance member 2, 6 is arranged to face at least a part of the rack teeth portion 130, and wherein the capacitance changes in accordance with the position of the rack shaft 13.

According to the second feature, in the position detection device 1 as described by the first feature, a plurality of rack teeth 130a are formed on the rack teeth portion 130 at predetermined intervals along the axial direction, and the capacitance member 2, 6 is arranged in such a manner that the capacitance changes with a period corresponding to a pitch P of the plurality of rack teeth 130a in the axial direction during a movement of the rack shaft 13.

According to the third feature, in the position detection device 1 as described by the first feature, the capacitance member 2, 6 is arranged to cover a periphery of one end of the rack teeth portion 130 in the axial direction, and a length of the capacitance member 2, 6 in the axial direction is more than or equal to a distance from one moving end $P_1$ to another moving end $P_2$ in a movement range of the rack shaft 13.

According to the fourth feature, in the position detection device 1 as described by the first feature, the calculation unit 4 calculates the position of the rack shaft 13 based on a rotation angle of an electric motor 16 that drives the pinion gear 151 and the capacitance.

Although the first and second embodiments of the present invention have been described above, these embodiments do not limit the invention according to the scope of claims. Also, it should be noted that not all combinations of features described in the embodiments are essential to the means for solving the problems of the invention.

In addition, the invention can be implemented by modifying it as appropriate to the extent that it does not go beyond the gist of the invention. For example, the first embodiment describes the case in which the calculation unit 4 calculates the position of the rack shaft 13 based on the rotation angle and the capacitance of the electric motor 16 detected by the rotation angle sensor 163. Here, when the vehicle is driving straight ahead while the steering angle detected by the steering angle sensor 18 is virtually zero, the position of the rack shaft 13 may be set as the neutral position, and the absolute position of the rack shaft 13 in the stroke range R may be detected by determining the amount of displacement from the neutral position based on the capacitance, for example.

Also, the first embodiment describes the case in which the capacitance is obtained by calculation based on the relationship between the current supplied to the capacitance member 2 and the voltage applied between the capacitance member 2 and the rack shaft 13. But not limited to this, the capacitance may be obtained by configuring a resonance circuit including the capacitance member 2 and calculating based on a resonance frequency. The same applies to the second embodiment.

Furthermore, the first embodiment describes the case in which the capacitance member 2 is formed in a circular shape, but not limited to this, a flat plate-shaped conductive member whose length in the axial direction of the rack shaft 13 is less than or equal to the pitch P of the plurality of rack teeth 130*a* may be used as a capacitance member. Additionally, in the second embodiment, the case in which the capacitance member 6 is formed in a cylindrical shape is described, but it is not limited to this case. A flat plate or semi-cylindrical conductive member whose length in the axial direction of the rack shaft 13 is more than or equal to the stroke range R may be used as the capacitance member.

The invention claimed is:

1. A position detection device configured to detect a position of a rack shaft having a rack teeth portion that meshes with a pinion gear in a part in an axial direction, comprising:

a capacitance member that is arranged around a periphery of the rack shaft and forms a capacitive load together with the rack shaft; and a computation unit including a central processing unit configured to calculate the position of the rack shaft based on a capacitance between the rack shaft and the capacitance member, wherein the capacitance member is arranged to face at least a part of the rack teeth portion at a portion that meshes with the pinion gear, and wherein the capacitance changes in accordance with the axial position of the rack shaft.

2. The position detection device according to claim 1, wherein a plurality of rack teeth are formed on the rack teeth portion at predetermined intervals along the axial direction, and wherein the capacitance member is arranged in such a manner that the capacitance changes with a period corresponding to a pitch of the plurality of rack teeth in the axial direction during a movement of the rack shaft.

3. The position detection device according to claim 1, wherein the capacitance member is arranged to completely cover a periphery of one end of the rack teeth portion in the axial direction, and wherein a length of the capacitance member in the axial direction is more than or equal to a distance from one moving end to another moving end in a movement range of the rack shaft.

4. The position detection device according to claim 1, wherein the computation unit is configured to calculate the position of the rack shaft based on a rotation angle of an electric motor that drives the pinion gear and the capacitance.

\* \* \* \* \*